(12) United States Patent
Müller et al.

(10) Patent No.: US 8,603,378 B2
(45) Date of Patent: Dec. 10, 2013

(54) PROCESS FOR THE PRODUCTION OF THIN LAYERS OF SILICONE, THIN SILICONE AND USE

(75) Inventors: Josef Müller, Forchheim (DE); Walter Günter, Forchheim (DE); Michael Bauer, Forchheim (DE); Kurt Stark, Forchheim (DE)

(73) Assignee: Huhtamaki Forchheim Zweigniederlassung der Huhtamaki Deutschlang GmbH & Co. KG, Forchheim (DE)

( * ) Notice: Subject to any disclaimer, the term of this patent is extended or adjusted under 35 U.S.C. 154(b) by 965 days.

(21) Appl. No.: 11/287,609

(22) Filed: Nov. 28, 2005

(65) Prior Publication Data

US 2006/0127588 A1    Jun. 15, 2006

(30) Foreign Application Priority Data

Nov. 26, 2004    (DE) .................... 10 2004 057 382

(51) Int. Cl.
*B32B 25/12*    (2006.01)

(52) U.S. Cl.
USPC .............. 264/171.24; 156/350; 156/390

(58) Field of Classification Search
USPC .............. 264/171.24; 156/350, 390
See application file for complete search history.

(56) References Cited

U.S. PATENT DOCUMENTS

| 3,815,506 A * | 6/1974 | Tamulevich et al. .......... 102/290 |
| 4,151,319 A * | 4/1979 | Sackoff et al. ............... 428/41.4 |
| 4,339,485 A * | 7/1982 | Shibano et al. ............... 428/41.3 |
| 4,425,176 A | 1/1984 | Shibano et al. |
| 4,499,148 A * | 2/1985 | Goodale et al. ............... 428/447 |
| 4,557,887 A | 12/1985 | Ona et al. |
| 4,626,460 A * | 12/1986 | Duncan ....................... 428/41.4 |
| 4,837,088 A * | 6/1989 | Freedman .................... 156/243 |
| 4,839,123 A * | 6/1989 | Duncan ....................... 264/477 |
| 5,064,579 A * | 11/1991 | Kendall et al. ................ 264/448 |
| 5,082,706 A * | 1/1992 | Tangney ...................... 428/40.7 |
| 5,143,676 A * | 9/1992 | Muller et al. ............. 264/173.14 |
| 5,660,922 A * | 8/1997 | Herridge et al. .............. 428/214 |
| 6,372,870 B1 | 4/2002 | Kitahara et al. |
| 7,153,581 B2 | 12/2006 | Stark |
| 7,648,608 B2 | 1/2010 | Guenter |
| 2003/0008153 A1 | 1/2003 | Migliorini et al. |
| 2005/0118443 A1* | 6/2005 | Lee et al. ...................... 428/480 |
| 2006/0204765 A1 | 9/2006 | Scheim et al. |

FOREIGN PATENT DOCUMENTS

| DE | 39 38 808 | 5/1991 |
| DE | 100 21 109 | 11/2001 |
| DE | 102 16 608 | 10/2003 |
| DE | 103 44 600 | 4/2004 |

(Continued)

OTHER PUBLICATIONS

Fuchs, Peter: "Extrusion und Vernetzung von festem Siliconkautschuk," Plastverarbeiter, Huethig GmbH, Heidelberg, Germany; Bd. 44, No. 6, Jun. 1, 1993, pp. 46-48 and 50.

(Continued)

*Primary Examiner* — Yogendra Gupta
*Assistant Examiner* — John Robitaille
(74) *Attorney, Agent, or Firm* — Collard & Roe, P.C.

(57) ABSTRACT

An process for producing thin silicone by extrusion of a layer of silicone. The silicone layer may be extruded onto a substrate layer. The silicone layer and the substrate layer may be extruded together out of an extrusion die.

14 Claims, 2 Drawing Sheets

(56) References Cited

FOREIGN PATENT DOCUMENTS

| | | |
|---|---|---|
| DE | 103 16 521 | 8/2004 |
| EP | 0 241 207 | 10/1987 |
| EP | 0 429 911 | 6/1991 |
| EP | 1 354 900 | 10/2003 |
| JP | 58-219022 | 12/1983 |
| JP | 01-141972 | 6/1989 |
| JP | 63-009531 | 8/1989 |
| JP | 03-270933 | 12/1991 |
| JP | 05-028909 | 12/1994 |
| JP | 07-138381 | 5/1995 |
| JP | 08-216345 | 8/1996 |
| JP | 08-323857 | 12/1996 |
| JP | 09-316830 | 12/1997 |
| JP | 10-053659 | 12/1998 |
| JP | 11-100241 | 4/1999 |
| JP | 11-286077 | 10/1999 |
| JP | 2000-059977 | 2/2000 |
| JP | 2001-062959 | 3/2001 |
| JP | 2001-088246 | 4/2001 |
| JP | 2001-526984 | 12/2001 |
| JP | 2004-142179 | 5/2004 |
| JP | 2004-298897 | 10/2004 |
| KR | 10-2001-0079950 | 8/2001 |
| KR | 10-2011-0014114 | 2/2011 |
| SU | 950 738 | 8/1982 |
| WO | WO 98/58973 | 12/1998 |
| WO | WO 99/33651 | 7/1999 |
| WO | WO 01/83212 | 11/2001 |
| WO | WO 2004/089616 | 10/2004 |

OTHER PUBLICATIONS

Wacker Chemie GmbH, "Geniomer® 80," Internet pdf article, Aug. 17, 2004, pp. 1-2. URL: http://www.wacker.com/internet/webcache/de_DE/PTM/TM/GENIOMER/GENIOMER_80_d.pdf.

Monographie Chemische Enzyklopaedie, Band 4, Moskau, Grosse russische Enzyklaedie, 1995, Seiten 7-8, pp. 1-4.

Translation of Japanese Examination Report dated Apr. 28, 2011 in Japanese Application No. 2005-340222.

* cited by examiner

PROCESS FOR THE PRODUCTION OF THIN LAYERS OF SILICONE, THIN SILICONE AND USE

BACKGROUND OF THE INVENTION

1. Field of the Invention

The invention relates to a process for the production of thin layers of silicone, the thin silicone layer produced by this process and the use of the thin silicone layer.

2. The Prior Art

Many different silicone coatings have been disclosed that can be used thinly and sparingly, but all of them have the disadvantage that they have to be applied to a substrate laboriously in an additional operation.

SUMMARY OF THE INVENTION

It is therefore an object of the invention to provide a process for the production of thin layers of silicone that can be carried out in a single, simple operation. In the invention, the silicone layer is extruded.

The silicone layer is preferably extruded onto a substrate layer. The silicone layer and the substrate layer can also be extruded together out of an extrusion die. A silicone layer can be produced very simply and quickly in this way. In another embodiment, the substrate layer is added after the silicone layer has been extruded.

In another embodiment, the silicone layer is covered by a top layer. The silicone layer is protected against damage by the top layer. The top layer may be added after the silicone layer has been extruded. The top layer could also be extruded together with the silicone layer. The top layer is produced in a single operation together with the silicone layer as a result. In another embodiment, a tie layer is incorporated between the substrate layer and the silicone layer. It has also proved to be very advantageous if a tie layer is incorporated between the top layer and the silicone layer. An effective bond between the layers is guaranteed by this.

The tie layer is preferably extruded together with the silicone layer. It is also very advantageous if the tie layer is extruded together with the top layer or the substrate layer.

The tie layer may be applied to the silicone layer after the silicone layer has already been extruded. The tie layer may also be applied to the top layer and/or substrate layer after they have already been extruded.

A complete multilayer combination consisting of a substrate layer, a silicone layer and a top layer may be coextruded. A tie layer may be provided between the silicone layer and the substrate layer and/or top layer and coextruded together with the other layers.

A multilayer combination can be produced inexpensively in just one operation in this way. It has also proved to be extremely advantageous if the combination of the substrate layer and the silicone layer is oriented. This changes the properties of the silicone layer and reduces the thickness of the silicone layer. The combination of the substrate layer, silicone layer and top layer is preferably oriented. Any cracking or tearing of the silicone layer during the orientation operation is avoided effectively as a result. The silicone layer is still protected after the orientation operation too.

The substrate layer and/or top layer may be pulled off after extrusion and/or orientation. A film siliconized on one side or a purely silicone layer is produced in this way. It is also very advantageous if in accordance with the invention the finished silicone layer is wound up.

This makes it particularly easy to store and transport the finished silicone layer. It has proved to be very advantageous in this context if a top layer or a substrate layer is provided between two layers of the silicone layer. This prevents two layers of the silicone from sticking together. Very advantageous thin, extruded silicone can be produced by a the process according to the invention when a thermoplastic silicone elastomer is used.

A thermoplastic silicone elastomer can be extruded particularly well. It has proved to be very advantageous in this context if a thermoplastic material, particularly a thermoplastic film, is used as the substrate layer and/or top layer. It is also very advantageous if polyethylene, particularly LDPE or LLDPE, is used as the thermoplastic material.

In another embodiment, polypropylene, particularly polypropylene homopolymers and polypropylene copolymers, is used as the thermoplastic material. It is also very advantageous if a blend of different materials is provided as the substrate layer and/or top layer. Thermoplastic materials are a particularly suitable choice as the substrate layer and/or top layer because of their properties.

In another embodiment, ethylene acrylate copolymers, ethylene vinyl acetate copolymers, acid copolymers, polymers with acidanhydride-functions, especially with unsaturated acidanhydrides equipped polyethylene and polypropylene, polymers and copolymerisates containing hydroxyl groups, especially polyvinyl alcohols, ethylene containing polyvinyl alcohols and hydroxyethylacrylates, or ionomers are used as tie layers.

It is also very advantageous in this context if the tie layers consist of blends or batches that contain ethylene acrylate copolymers, ethylene vinyl acetate copolymers, acid copolymers, polymers with acidanhydride-functions, especially with unsaturated acidanhydrides equipped polyethylene and polypropylene, polymers and copolymerisates containing hydroxyl groups, especially polyvinyl alcohols, ethylene containing polyvinyl alcohols and hydroxyethylacrylates and/or ionomers at least to some extent.

It has also proved to be very advantageous if ethylene vinyl acetate copolymers are provided as tie layers, where the copolymers preferably account for more than 5%. Due to these tie layers, the bond between the silicone layer and the other layers can be adapted within a wide range.

In accordance with another further development of the invention, the substrate layer is preferably between 5 and 3,000 µm thick before orientation, is in particular between 10 and 500 µm thick, and is most preferably between 10 and 200 µm thick.

It has also proved to be very advantageous if the top layer is between 5 and 3,000 µm thick before orientation, is in particular between 10 and 500 µm thick and is preferably between 10 and 200 µm thick.

It is also very advantageous if the thermoplastic silicone elastomer is between 1 and 3,000 µm thick, in particular between 1 and 70 µm thick, more particularly between 1 and 30 µm thick, and very particularly between 5 and 20 µm thick.

In another embodiment, more than 90% of the thermoplastic silicone elastomer is preferably accounted for by an organic silicone component.

The silicone component is essentially responsible for the release properties of the silicone elastomer. Good release properties are guaranteed by the large proportion of the elastomer accounted for by the silicone component.

It has also proved to be very advantageous if the silicone elastomer has a release force in relation to adhesives, particularly in relation to pressure-sensitive adhesives, of between 1 and 700 cN/cm, preferably between 5 and 100 cN/cm. This guarantees a wide range of different applications for the silicone elastomer as a release material.

It is also very advantageous if the silicone elastomer has a melt viscosity of between 10,000 and 100,000, in particular between 35,000 and 45,000 Pas. This makes it possible to extrude the silicone elastomer very effectively.

It has also proved to be very advantageous if the silicone elastomer has a Shore hardness level of between 10 and 100 and in particular between 50 and 60.

In another very advantageous further development of the invention, the reduction in adhesive force in accordance with FINAT 11 of a pressure-sensitive adhesive due to the silicone elastomer is <30%, in particular <10%.

This means that the adhesive force of a pressure-sensitive adhesive is influenced as little as possible during storage. It has also proved to be very advantageous if the thickness of the silicone elastomer layer amounts to between 1 and 400 μm after orientation, is in particular between 1 and 50 μm and is preferably between 1 and 5 μm.

In another very advantageous application for thin silicone in accordance with the invention, a combination of a silicone layer and a top layer and/or substrate layer is used to produce, cover or line an object provided with a silicone layer, in particular a pack or a container.

The inside of the container is, for example, prepared to hold pressure-sensitive adhesives in this way. The silicone layer is preferably laminated to a basic material, where the substrate or top layer is facing away from the basic material, and is then thermoformed together with the basic material to produce a container.

It has also proved to be very advantageous if the combination of a substrate layer, a silicone layer and a top layer is applied to a basic material together and is then thermoformed together with the basic material to produce a container.

It is very advantageous in this context if the combination of a substrate layer, a silicone layer and a top layer is thermoformed together to produce a container. It has proved to be extremely advantageous if the substrate layer or the top layer is pulled off after the container has been completed.

The bonding of the silicone layer to the substrate layer stops the silicone layer from tearing during thermoforming. This effect is reinforced by the top layer. The top layer also stops the silicone layer being damaged at all when the unfilled containers are produced and transported.

In another embodiment, the silicone layer forms a highly transparent protective layer for the object that preferably resists weathering. It is also very advantageous if the silicone layer forms a protective layer for the object that repels dirt. An object etc. can be protected against numerous environmental influences as a result.

In another embodiment, the silicone layer is used as a protective layer on particularly smooth surfaces. It is very advantageous in this context if the silicone layer is bonded to particularly smooth surfaces by adhesion.

Applications for the silicone layer as protective layers that can be pulled off and/or replaced are possible as a result. It has also proved to be advantageous in accordance with another further development of the invention if the silicone layer is used as a release layer in patterns of any kind.

Applications for the silicone layer possibly in connection with further layers that are designed to separate several layers of an object are feasible as a result of this, for example. In another embodiment, the silicone layer is used in hygiene applications, particularly in hygiene packaging etc. This guarantees that such packs etc. can be produced very simply.

In another embodiment, the silicone layer is used as an intermediate layer between several layers of a window pane. Panes of safety glass can then, for example, be produced with an intermediate layer with the silicone layer according to the invention.

It has also proved to be extremely advantageous if the silicone layer is produced in combination with further layers and forms a window pane etc. together with these layers. This makes it possible to manufacture window panes, spare panes etc. in a single operation too.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
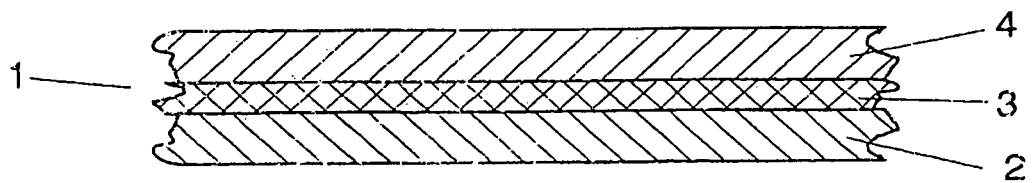
FIG. 1 shows a three-layer coextrudate.

In a first example, a three-layer coextrudate 1 is extruded from a die. This coextrudate 1 consists of a substrate layer 2 made from a thermoplastic material, next to which is a silicone layer 3 made from a thermoplastic silicone elastomer. The silicone elastomer is followed by a top layer 4 that is also made from a thermoplastic material.

The thermoplastic material can be polyethylene, e.g. LDPE or LLDPE, polypropylene etc. or a blend of different materials. After it has been extruded, the coextrudate can be oriented longitudinally and/or transversely, as a result of which the strength properties of the individual layers are improved and the thickness of the layers is reduced. The substrate layer 2 and the top layer 4 can each be between 10 and 500 μm thick in the extrusion process. The silicone layer 3 can be between 5 and 30 μm thick.

These thicknesses are reduced significantly by the orientation operation, so that at the moment silicone layers 3 with a thickness of 1 to 5 μm are achievable. With improved adjustment of the stretching methods, also silicone layers 3 down to a thickness of 0.1 μm are achievable. The particular effect is that silicone layer 3 does not form cracks or tear apart completely.

Figure 2:
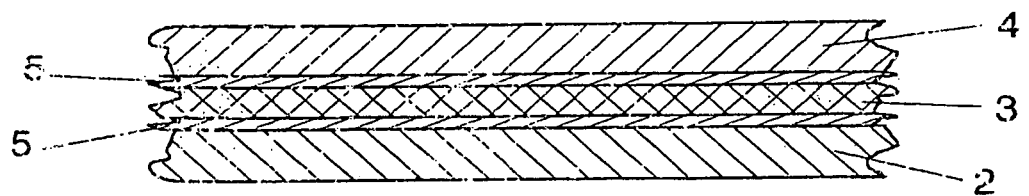
FIG. 2 shows a five-layer coextrudate.
Figure 3:
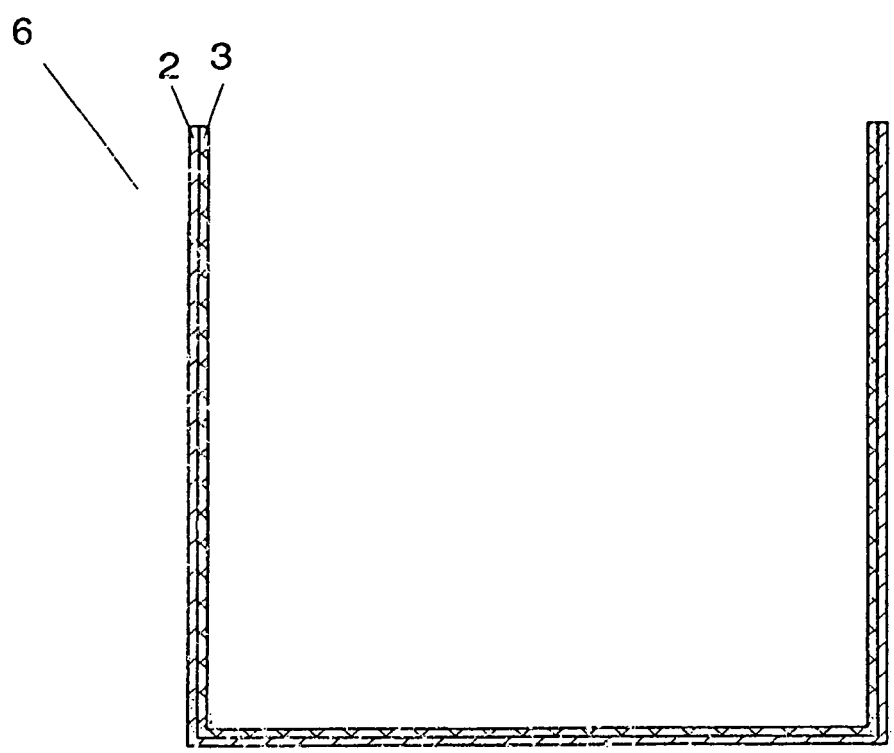
FIG. 3 shows a thermoformed container that contains part of the coextrudate.

Top layer 4 or substrate layer 2 can be pulled off after the orientation operation. It is, however, also conceivable for a tie layer 5 to be provided between silicone layer 3 and substrate layer 2 and/or top layer 4, as is shown in FIG. 2.

The adhesive force between the individual layers can be adapted over a wide range via the tie layer 5. Ethylene acrylate copolymers, ethylene vinyl acetate, acid copolymers, polymers with acidanhydride-functions, especially with unsaturated acidanhydrides equipped polyethylene and polypropylene, polymers and copolymerisates containing hydroxyl groups, especially polyvinyl alcohols, ethylene containing polyvinyl alcohols and hydroxyethylacrylates, ionomers etc. can in particular be used as tie layers. These tie layers can also be formed of blends or batches with other substances.

The acid anhydride- and/or hydroxyl-group functionalized tie layers can be produced by copolymerization of especially organic monomers with unsaturated acid anhydrides and hydroxyl-group-containing monomers respectively, e.g. maleic acid anhydrides, hydroxylethylacrylates, hydroxypropylacrylates etc., or by grafting of polymers with unsaturated acid anhydrides and hydroxyl group containing monomers respectively.

It is, however, also conceivable for at least the substrate layer 2 or the top layer 3 to be provided as an additional web and to be added directly after extrusion. Such a coextrudate is particularly suitable for the production and lining of containers that are to be filled with sticky substances.

It is therefore conceivable for the coextrudate 1 to be used to wrap blocks etc. of pressure-sensitive adhesives, for example. It is, however, also conceivable that the coextrudate 1 is thermoformed to produce a container 6. It is, however, also possible for the coextrudate 1 to be applied to another substrate, from which a pack is produced together with the coextrudate 1, for example by thermoforming.

The coextrudate 1 is oriented in the thermoforming operation. It is also conceivable that only part of the coextrudate 1 is used for the thermoforming and/or packaging operation.

Substrate layer 2 or top layer 4 of coextrudate 1 can, for example, be pulled off before the rest of the coextrudate is, for example, applied to a thick layer of polypropylene film. This thick layer of film is then thermoformed together with silicone layer 3. The remaining top layer 4 or substrate layer 2 prevent unwelcome cracking of silicone layer 3, as it does during orientation. The remaining top layer 4 or substrate layer 2 can be pulled off after the thermoforming operation or shortly before the container is filled with the product that is being packaged. Damage to the silicone layer 3 is prevented during transport of the container as a result.

It is, however, also conceivable for coextrudate 1 to be used for other applications too. Coextrudate 1 can, for example, be the basis for the production of labels, hygiene packs, films that provide protection against environmental influences, removable protective films, intermediate layers in panes of safety glass, window panes etc. Additional layers that are needed for these applications are either added to coextrudate 1 subsequently or they are extruded directly together with the layers of coextrudate 1.

When coextrudate 1 is used for hygiene packs, the substrate film may be provided with a filler such as chalk. A coextrudate 1 manufactured by the blown film process with a substrate layer 2 thickness of between 100 and 300 µm, a tie layer thickness of between 10 and 20 µm and an extruded silicone layer thickness of between 8 and 15 µm can be oriented in such a way that the thickness of the substrate film after orientation is between 30 and 70 µm. The silicone layer is reduced to a thickness of up to 1 µm in this process. The stiffness and strength of the coextrudate is increased considerably at the same time.

Accordingly, while only a few embodiments of the present invention have been shown and described, it is obvious that many changes and modifications may be made thereunto without departing from the spirit and scope of the invention.

What is claimed is:

1. Process for the production of thin layers of extrudable silicone, comprising extruding a layer of silicone onto a substrate layer,
   wherein the silicone layer is covered by a top layer, wherein the silicone layer is arranged between the substrate layer and the top layer,
   wherein the substrate layer, silicone layer and top layer are oriented together after the silicone layer is extruded onto the substrate layer and covered by the top layer, and
   wherein at least one of the substrate layer and top layer are pulled off after extrusion and orientation.

2. Process according to claim 1, wherein the top layer is added after the silicone layer has been extruded.

3. Process according to claim 1, wherein the top layer is extruded together with the silicone layer.

4. Process according to claim 1, wherein a tie layer is incorporated between the substrate layer and the silicone layer.

5. Process according to claim 1, wherein a tie layer is incorporated between the top layer and the silicone layer.

6. Process according to claim 4, wherein the tie layer is extruded together with the silicone layer.

7. Process according to claim 5, wherein the tie layer is extruded together with the top layer or the substrate layer.

8. Process according to claim 4, wherein the tie layer is applied to the silicone layer after the silicone layer has already been extruded.

9. Process according to claim 4, wherein the tie layer is applied to the substrate layer after the substrate layer has already been extruded.

10. Process according to claim 1, wherein the substrate layer and the top layer are coextruded with the silicone layer.

11. Process according to claim 10, wherein a tie layer provided between the silicone layer and the substrate layer or top layer is coextruded together with the other layers.

12. Process according to claim 1, further comprising winding up the finished silicone layer.

13. Process according to claim 12, wherein the silicone layer comprises two layers, and wherein a top layer or a substrate layer is provided between the two layers of the silicone layer.

14. A process for the production of thin layers of extrudable silicone, comprising coextruding the silicone layer and substrate layer together out of an extrusion die,
   wherein the silicone layer is covered by a top layer,
   wherein the silicone layer is arranged between the substrate layer and the top layer,
   wherein the substrate layer, silicone layer and top layer are oriented together after the silicone layer is extruded with the substrate layer and covered by the top layer, and
   wherein at least one of the substrate layer and top layer are pulled off after extrusion and orientation.

* * * * *

UNITED STATES PATENT AND TRADEMARK OFFICE
CERTIFICATE OF CORRECTION

| | | |
|---|---|---|
| PATENT NO. | : 8,603,378 B2 | Page 1 of 1 |
| APPLICATION NO. | : 11/287609 | |
| DATED | : December 10, 2013 | |
| INVENTOR(S) | : J. Mueller et al. | |

It is certified that error appears in the above-identified patent and that said Letters Patent is hereby corrected as shown below:

Title Page, item [73] Assignee: should read as follows:

-- Huhtamaki Forchheim Zweigniederlassung der Huhtamaki Deutschland GmbH & Co. KG --.

Signed and Sealed this
Fourth Day of March, 2014

Michelle K. Lee
*Deputy Director of the United States Patent and Trademark Office*